US012105193B2

(12) United States Patent
Al-Ani

(10) Patent No.: US 12,105,193 B2
(45) Date of Patent: Oct. 1, 2024

(54) ISAR IMAGING

(71) Applicant: Kabushiki Kaisha Toshiba, Tokyo (JP)

(72) Inventor: Mustafa Al-Ani, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 410 days.

(21) Appl. No.: 17/526,694

(22) Filed: Nov. 15, 2021

(65) Prior Publication Data

US 2023/0152445 A1    May 18, 2023

(51) Int. Cl.
  *G01S 13/90*    (2006.01)
(52) U.S. Cl.
  CPC ...... *G01S 13/9064* (2019.05); *G01S 13/9004* (2019.05)
(58) Field of Classification Search
  CPC ............. G01S 13/9064; G01S 13/9004; G01S 7/0235; H04B 7/0413; H04B 7/212; H04L 27/001; H04L 27/2601
  See application file for complete search history.

(56) References Cited

U.S. PATENT DOCUMENTS

2020/0025906 A1* 1/2020 Kesaraju ............... G01S 13/931

OTHER PUBLICATIONS

Tarczynski, et al., "Estimation of Fourier Transform Using Alias-Free Hybrid-Stratified Sampling" IEEE Transactions on Signal Processing, vol. 64, No. 12, Jun. 15, 2016, 12 pages.
Al-Ani, et al., "Evaluation of Fourier Transform Estimation Schemes of Multidimensional Signals Using Random Sampling" Signal Processing, vol. 92, 2012, 13 pages.
Masry et al., "Random Sampling Estimates of Fourier Transforms: Antithetical Stratified Monte Carlo" IEEE Transactions on Signal Processing, vol. 57, No. 1, Jan. 2009, 11 pages.
Donoho, "Compressed Sensing," IEEE Transactions on Information Theory, vol. 52, No. 4, Apr. 2006, 18 pages.
Roos et al., "Comparison of 2D and 3D Compressed Sensing for High-Resolution TDM-MIMO Radars", Proceedings of the 16th European Radar Conference (EuRAD), 2019, 4 pages.

* cited by examiner

*Primary Examiner* — Bernarr E Gregory
*Assistant Examiner* — Juliana Cross
(74) *Attorney, Agent, or Firm* — Oblon, McClelland, Maier & Neustadt, L.L.P.

(57) ABSTRACT

Antenna allocation is configured by way of a methodically random TDMA pattern that can allow the decrease in the pulse repetition rate without the reduction in the maximum resolved cross-range associated with conventional uniform TDMA. Embodiments disclosed herein offer opportunity for development of high-resolution mmWave radar systems for walk-through search and reduces the interference from surrounding objects. Other applications include synthetic-aperture radar (SAR), and other radar Range-Velocity-DOA imaging systems in automotive applications and robotics.

12 Claims, 6 Drawing Sheets

ISAR IMAGING

FIELD

The present disclosure relates to Inverse synthetic-aperture Radar (ISAR).

BACKGROUND

Inverse synthetic-aperture radar (ISAR) is a two-dimensional (range and cross-range) imaging technique that operates by radiating a moving target with multiple pulses. Three-dimensional images (range, cross-range and elevation) can be achieved with multiple antennas in an array operating (orthogonally) on the same moving target using multiple-input multiple-output (MIMO) techniques.

DESCRIPTION OF EMBODIMENTS

One approach to achieving orthogonality among transmitting antennas of an ISAR is through time-division multiple access (TDMA). In certain implementations of TDMA, increasing the number of transmitting antennas (to improve the elevation resolution) leads to a direct decrease in the pulse repetition rate per antenna. This in turn reduces the maximum resolved cross-range in the ISAR image.

Embodiments disclosed herein provide a methodically random TDMA pattern based on advanced Monte Carlo integrations that can allow the decrease in the pulse repetition rate without the reduction in the maximum resolved cross-range associated with conventional uniform TDMA. Embodiments disclosed herein offer opportunity for development of high-resolution mmWave radar systems for walk-through search and reduces the interference from surrounding objects. Other applications include synthetic-aperture radar (SAR), and other radar Range-Velocity-DOA imaging systems in automotive applications and robotics.

Aspects of the disclosure comprise a methodically randomised TDMA scheme that can reduce the number of transmitted pulses per antenna without compromising the maximum resolved cross-range in MIMO-ISAR/SAR radar imaging or the maximum unambiguous Doppler frequency in Range-Velocity-DOA imaging.

In an embodiment, the TDMA scheme may use a randomised allocation within predefined criteria. Embodiments achieve an increase in the maximum resolved cross-range in ISAR imaging independently of the pulse repetition rate. Embodiments achieve increases in the maximum unambiguous Doppler frequency in Doppler-range imaging independently of the pulse repetition rate. Aspects of embodiments disclosed herein may increase the number of transmitters in TDMA-MIMO for radar imaging without compromising the maximum resolved Doppler or cross-range. In embodiments, FFT can be used to process the randomly collected data with no computationally demanding reconstruction algorithms. Embodiments in accordance with the present disclosure may prevent the overlap of cluttering image onto the target image. This may be achieved by suppressing the energy of cluttering objects into a white-noise-like error that appears across the image. This error may decay with the pulse repetition rate in the mean-square sense at the rate of power −5 in the vicinity of the target centre in the radar image.

Figure 1:
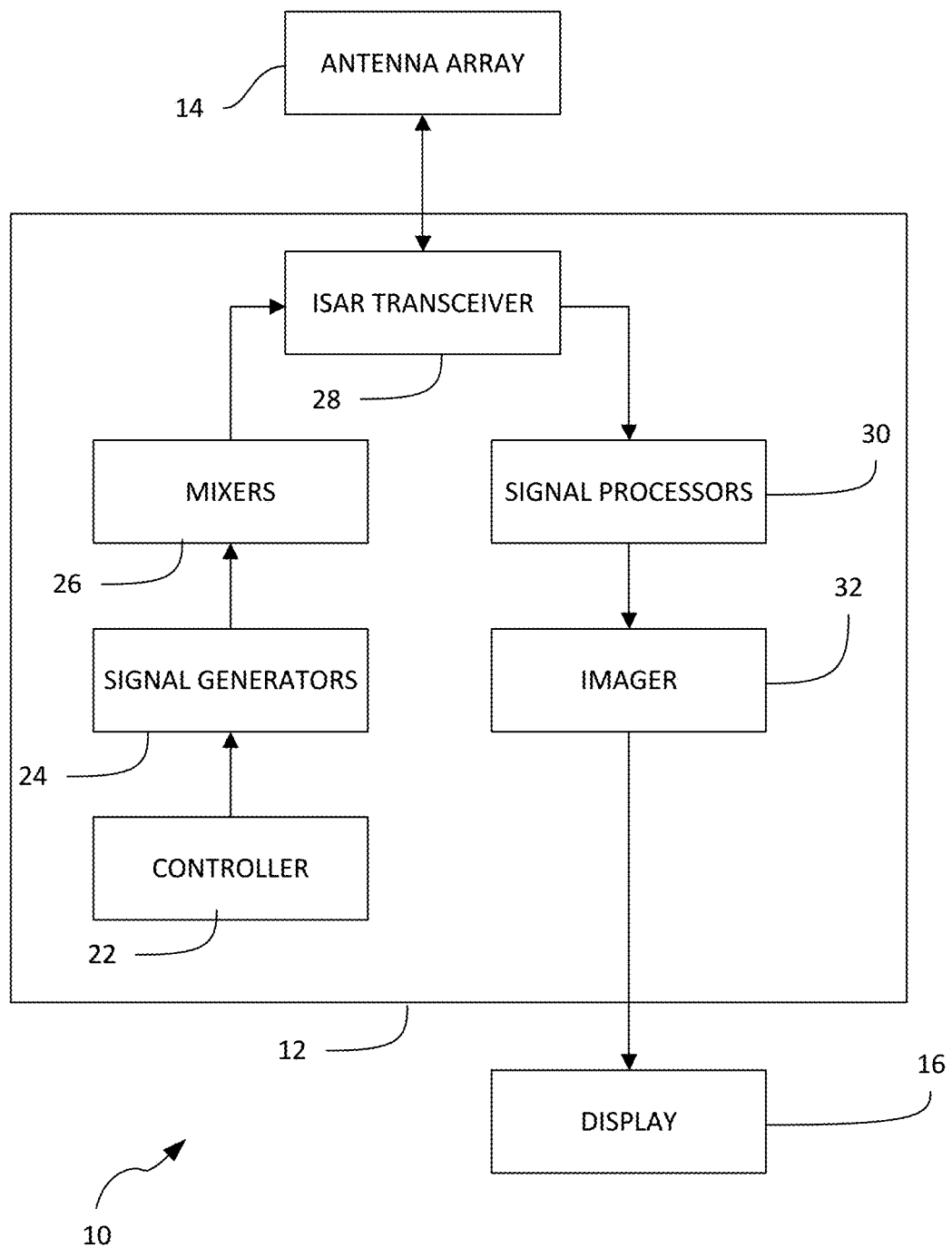
FIG. 1 illustrates a schematic diagram of an ISAR system in accordance with an embodiment.

FIG. 1 illustrates an ISAR system configured in accordance with the present disclosure. The ISAR system 10 is shown fulfilling a use case involving scanning a scene of interest, and displaying an image of the scene on a display. Other use cases may be contemplated, within the scope of this disclosure. One particular use case of interest, in the context of this disclosure, is the imaging of a passing pedestrian, for the purpose of public security. Other use cases may be contemplated, for instance for use in imaging for the purpose of guidance of autonomous vehicles.

So, as shown in FIG. 1, the ISAR system 10 comprises an ISAR unit 12 driving an antenna array 14, and presenting an output image on a display 16. In this embodiment, the antenna array comprises four equispaced linearly disposed antennas, but other configurations could also be contemplated.

The output to the display 16 could also, or alternatively, be harnessed for automated control. That is, if the ISAR unit 12 detects the presence and position of an object, the imaging information output to the display could also be fed to a device configured to determine the nature and character of the detected object. This could include a device configured by a machine learning algorithm to classify objects.

The ISAR unit 12 comprises a controller 22 operable to configure the generation of signals at the antennas of the antenna array 14. The controller 22 may be configurable by user input or, in certain embodiments, may be set by factory settings and, potentially, by software updates. Software executed by the controller 22 may be input by way of a storage medium or a signal bearing program information. Software may be delivered as a single software product, or may be delivered as a plug-in or update to pre-loaded software elements.

The controller 22 imparts information to signal generators 24 which act to generate signals for driving transmissions at the antenna array 14. In one embodiment, the signals transmitted by the signal generators 24 are a single stream, which are then multiplexed across the antenna array 14. In other embodiments, multiple signal generators 24 may each provide a signal stream per antenna of the antenna array 14.

The signals generated by the signal generators 24 are passed to mixers 26 (again, in some embodiments, a single mixer may be sufficient), which up-mix the signals to an RF transmission frequency utilised in the Radar. These up-mixed signals are passed to a transceiver 28 which is operable to pass the signals to the antenna array 14 and, conversely, to detect incoming signals detected at the antenna array 14.

These detected incoming signals are passed to signal processors 30 which process the signals, in a conventional manner, translating the multiplexed signals into an imaging stream. The imaging stream is then processed by an imager 32 to produce an image signal, commensurate with the scene scanned by the ISAR. This image signal is output to the display 16.

Operation of the ISAR in further detail will now be described.

In general terms, inverse synthetic-aperture radar (ISAR) is an effective electromagnetic imaging technique for use with non-cooperative targets. With mmWave radars and the resolution they can achieve, the ISAR system can be used to detect concealed weapons for public security applications. In their most simple form, ISAR systems produce two-dimensional (range and cross-range) images of targets. An ISAR system operates by radiating the target with multiple pulses within a coherent time interval (CPI). To form three-dimensional images of targets, multiple-input multiple-output (MIMO) techniques can be used in the third dimension (elevation here).

Figure 2:
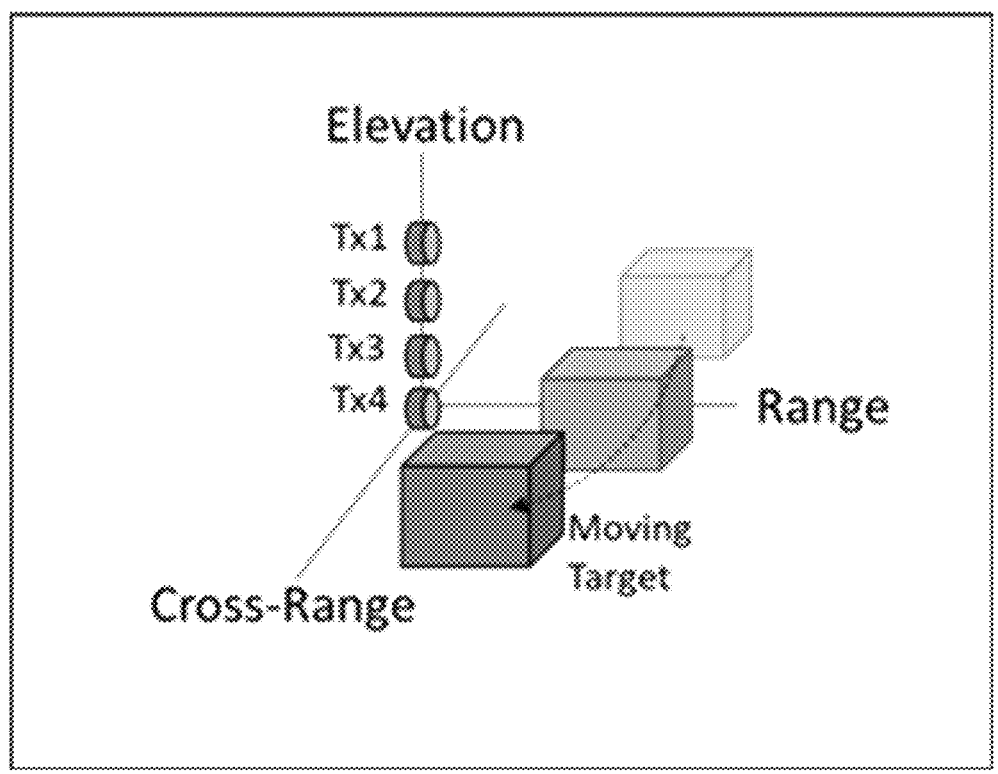
FIG. 2 illustrates a use case of the ISAR system of FIG. 1.

FIG. 2 illustrates the ISAR-MIMO system 10 with four transmitting antennas. MIMO radars require orthogonality between the transmitted signals, which can be achieved in various ways—with time division multiple access (TDMA) scheme being the simplest approach from a hardware perspective. With TDMA, only a single transmitter operates at a predefined timeslot, i.e., a single pulse per timeslot in ISAR. Thus, the number of transmitters in an ISAR-MIMO system dictates the pulse repetition frequency (PRF) per transmitter. With a conventional TDMA in ISAR, the maximum unambiguous cross-range, which corresponds to the Doppler frequency, is determined by the PRF.

Nowadays, the high frequencies and the high integration levels allow for these MIMO mmWave radar systems to become smaller and smaller which enables and drives the use of several antennas for transmitting and receiving to achieve an improved resolution (in elevation here). For fixed pulse duration, increasing the number of transmitters within a CPI directly decreases the PRF. This, in turn, reduces the maximum cross-range that can be resolved in the conventional system. The presence of (cluttering) scatterers beyond this cross-range results in an overlap and distortion of the image of the original target.

The 2D (range and cross-range) ISAR image is typically obtained by compressing the range profiles using azimuth discrete Fourier Transform (DFT) (FFT is usually used for efficient computations). In this embodiment, Alias-Free Fourier transform calculation, based on Monte Carlo integration, is used to increase the number of transmitting antennas without compromising the maximum resolved cross-range. According to this signal processing paradigm, the sampling pattern is randomised as per a defined probabilistic criterion, and a tailored DFT is applied to provide unbiased, consistent estimates of the target Fourier transform quantity.

Figure 3A:
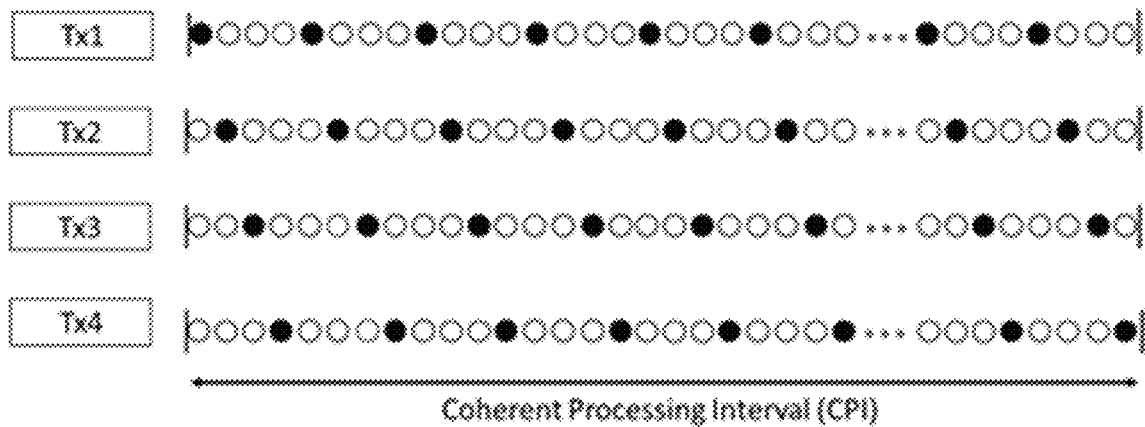
FIGS. 3A and 3B illustrate comparative examples of TDMA antenna allocation in accordance with a classical case and an embodiment.
Figure 3B:
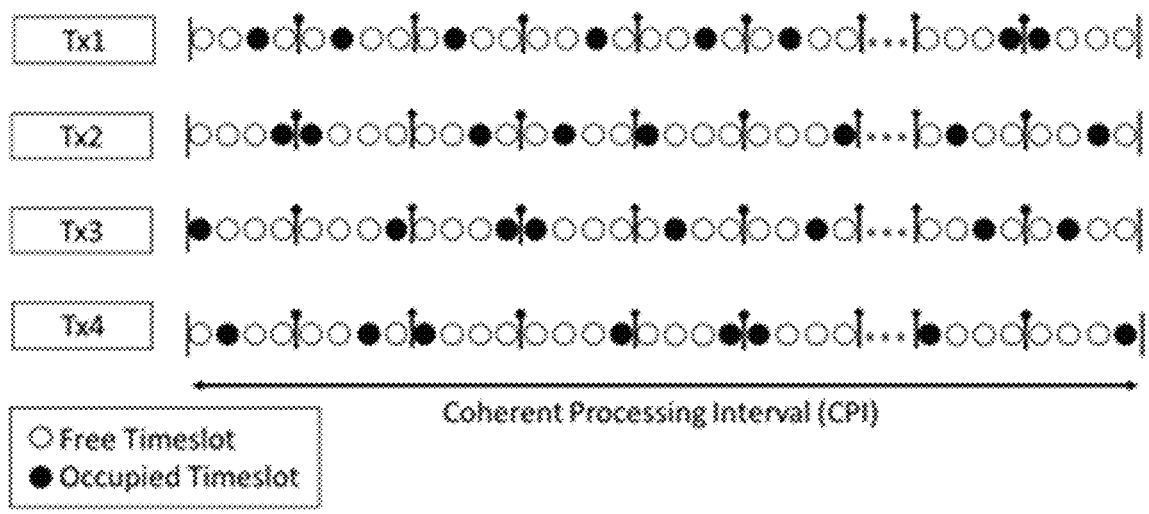

FIG. 3A illustrates a classical TDMA allocation of timeslots to transmitters. As can be seen, the timeslots are sequentially allocated to transmitters, which limits the pulse repetition frequency in an ISAR-MIMO system. The maximum unambiguous Doppler frequency and consequently the maximum resolved cross-range in the 2D ISAR image are governed by the PRF $f_{PRF}$.

By contrast, in the present embodiment, a distribution scheme is used that is based on antithetical stratified sampling, that can overcome this dependence/limitation in ISAR imaging.

Instead of the uniform distribution in conventional TDMA, the timeslots are distributed according to the following scheme:

The CPI is divided into N non-overlapping sub-intervals (strata), $\mathcal{T}_n$, n=1, . . . , N, where N is the number of allocated timeslots per transmitter in a CPI. The number of timeslots per stratum must be equal or larger than the number of transmitters.

One timeslot is selected per transmitter at random with no replacement per odd-order stratum: $\mathcal{T}_n$, n=1, 3, . . . , N−1.

A second timeslot is selected per transmitter per even-order stratum $\mathcal{T}_n$, n=2, 4, . . . , N as the symmetrical reflection of the random timeslot in the proceeding stratum. FIG. 2 illustrates the conventional uniform and the proposed TDMA schemes of four transmitters.

After collecting the pulses in the above allocation process, the classical FFT (with zero filling the free timeslots) would constitute an unbiased, consistent estimate of the sought Fourier transform, and it can be used to compress the pulses in the Doppler domain for numerical efficiency.

In general, randomising the allocated timeslots can offer the capacity to suppress the aliases of (cluttering) scatterers beyond the maximum resolved cross-range into a white-noise-like error that appears across the image. However, if all the timeslots are randomly distributed with no stratification or symmetrical reflection (i.e. a simple random pattern), this error decays in the mean-square sense at the rate of 1/N. Whereas, the adopted antithetical stratified offer the significantly faster rate of $1/N^5$ for motion compensated range profiles in ISAR.

With the classical uniform TDMA scheme, the maximum resolved cross-range is governed by the PRF $f_{PRF}$, and it is given by $\mp cf_{PRF}/(4f_c\Omega)$, where $f_c$ is the carrier frequency and $\Omega$ is the effective rotational velocity of the scene around its centre. Assuming that the transmission is continuous and there is no time gap between pulses, the PRF is defined by $$f_{PRF} = \frac{1}{uX}$$

where u is the pulse period (i.e., timeslot here), and X is the number of transmitters. According to the disclosed embodiment, the maximum resolved cross-range is independent of the number of transmitters and the pulse repetition density, and it is given by $\mp c/(4f_c\Omega u)$.

Figure 4:
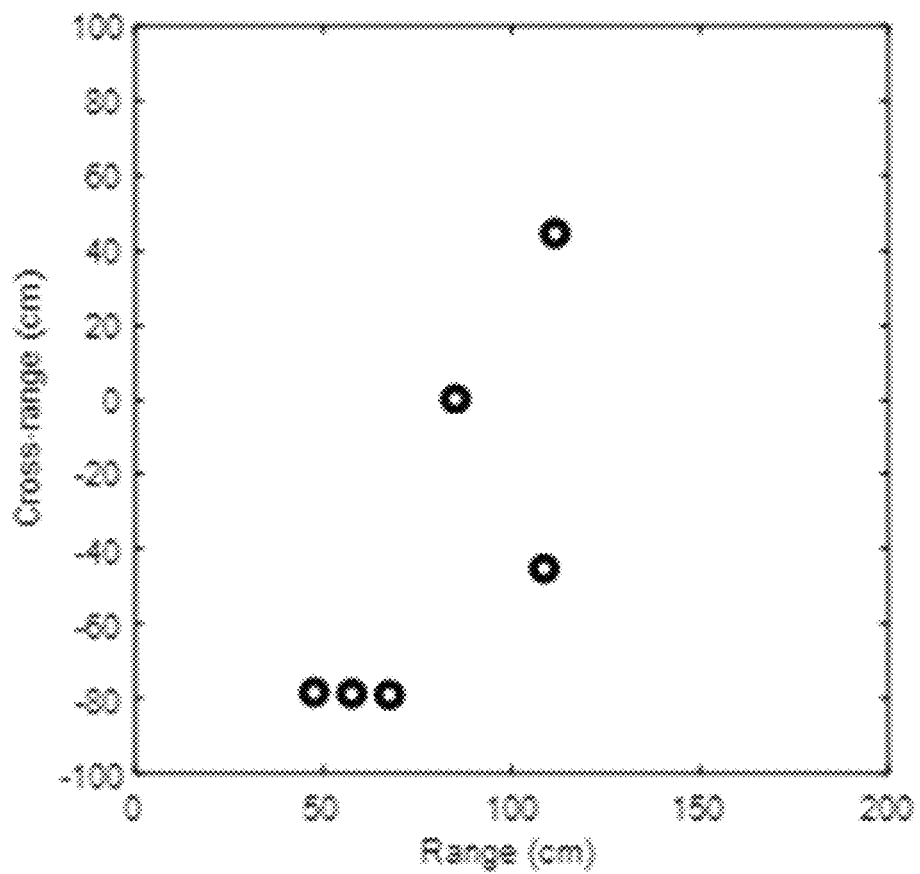
FIG. 4 illustrates a test example for application of a simulation of the embodiment.

To illustrate certain advantages of particular implementations of the disclosed embodiment, over the classical uniform scheme, a simulation will now be described. The objective of the simulation is to image a target object in the presence of another cluttering object at distance of about 1 m. The target object is a triangle with a scatterer at each corner, and the cluttering object is a line of three scatterers, as shown in FIG. 4. It is assumed there is no range misalignment or migration, and the objects are rotating at the speed of 0.1 rad/s relative to the centre of the target.

Figure 5A:
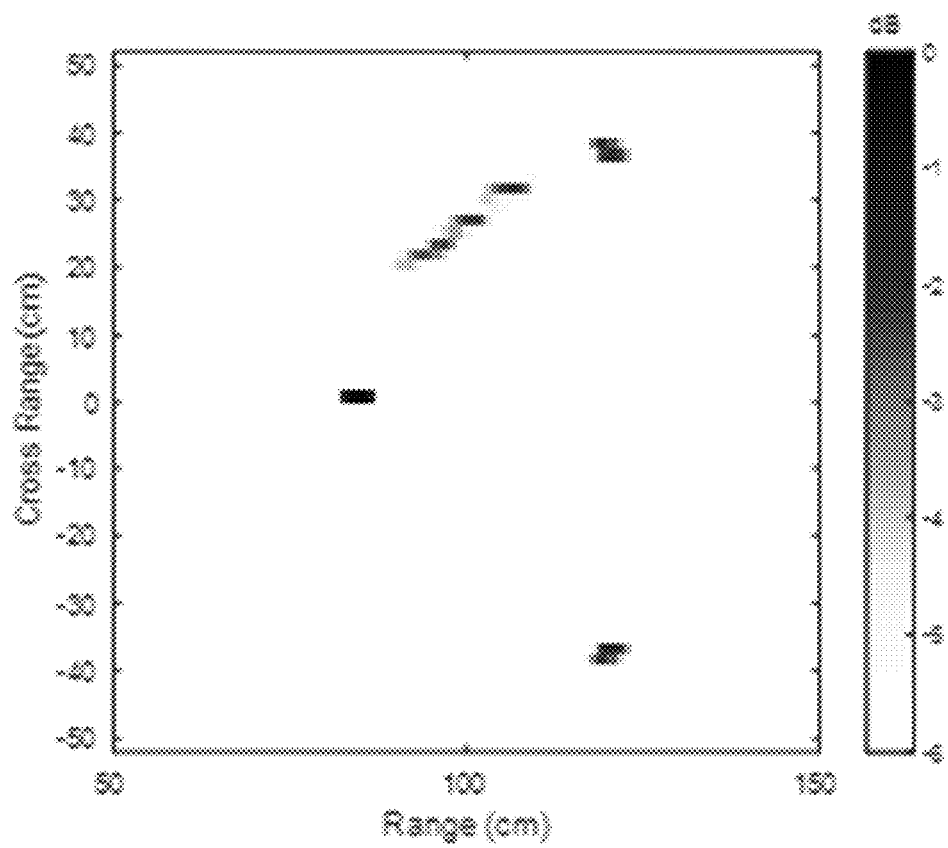
FIGS. 5A and 5B illustrate test results comparing performance of a classical case with a simulation of the embodiment.
Figure 5B:
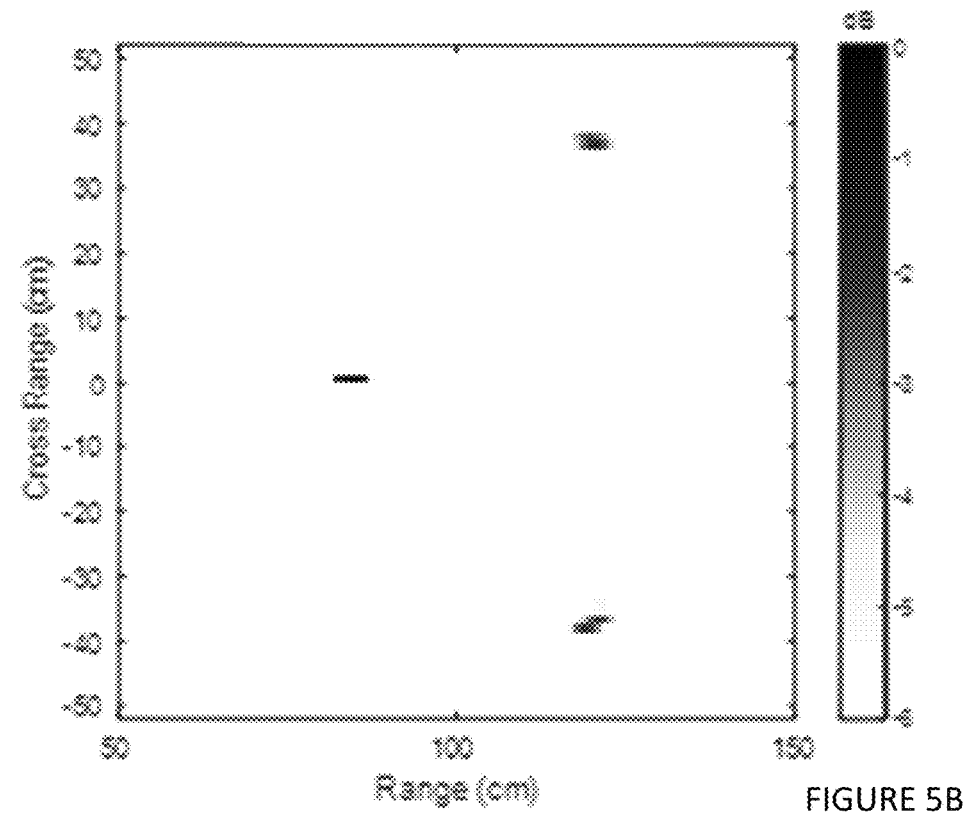

In FIGS. 5A and 5B, the target is imaged using pulses of period of 558 µs in a CPI of 1.14 s with pulse repetition rate and density of 55.94 pulse/s according to the classical TDMA approach and the disclosed embodiment, respectively. The maximum resolved cross-range according to the adopted pulse repetition rate is about $\mp 52$ cm in the conventional approach.

Figure 6:
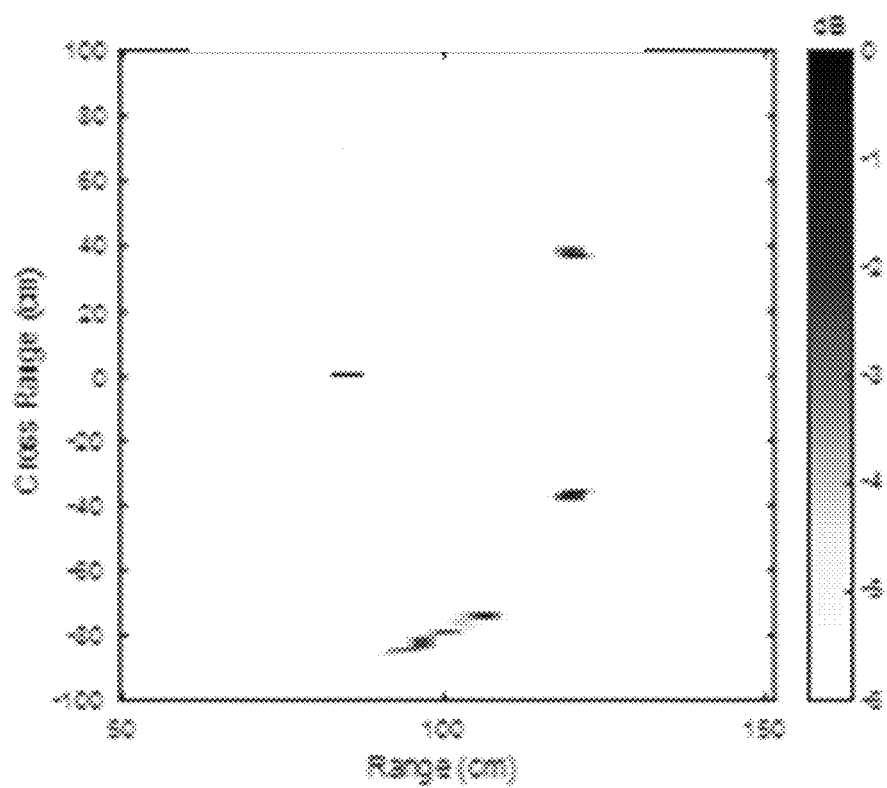
FIG. 6 illustrates an imaging output from the simulation of the embodiment.

In FIG. 5A it can be seen that the image of the cluttering object overlaps with the targeted image according to the conventional approach. In contrast, using the described embodiment, in FIG. 5B no cluttering object can be seen in the $\mp 52$ cm cross-range image. In fact, with the described embodiment, an image can be constructed of size $\mp 17$ m in cross-range. However, the level of white-noise-like error increases at higher cross-ranges, and its decay rate becomes 1/N instead of the fast $1/N^5$ rate achieved at lower cross-ranges. FIG. 6 shows an image of ∓100 cm cross-range according to the disclosed embodiment, where the cluttering object can be seen at its correct location.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A driver operable to generate a plurality of antenna driver signals, each antenna driver signal being for driving an antenna transmission at a radio frequency, RF, wherein the driver is operable to allocate timeslots defined in a processing interval to one of the antenna driver signals, such that, in a timeslot, a maximum of one of the antenna drive signals is allocated for transmission, the allocation being according to a non-sequential time division multiple access, TDMA, scheme, wherein the non-sequential TDMA scheme allocates timeslots to antenna driver signals such that, for a first set of timeslots, transmissions are allocated to antenna driver signals in a first sequence while, for a second set of timeslots, immediately sequentially following the first timeslots, transmissions are allocated to antenna driver signals in a second sequence, the second sequence being the first sequence in reverse.

2. The driver in accordance with claim 1, wherein the first sequence is randomized across the antenna driver signals.

3. The driver in accordance with claim 2, wherein the first sequence is generated in accordance with a sequence generation algorithm.

4. The driver in accordance with claim 3, wherein the sequence generation algorithm is operable to generate a sequence of timeslots, the number of timeslots in the sequence being equal to the number of antenna driver signals to which transmissions are to be allocated.

5. A method of allocating antenna driver signals, each antenna driver signal being for driving an antenna transmission at a radio frequency, RF, comprising allocating timeslots defined in a processing interval to one of the antenna driver signals, such that, in a timeslot, a maximum of one of the antenna drive signals is allocated for transmission, the allocation being according to a non-sequential time division multiple access, TDMA, scheme, wherein the non-sequential TDMA scheme allocates timeslots to antenna driver signals such that, for a first set of timeslots, transmissions are allocated to antenna driver signals in a first sequence while, for a second set of timeslots, immediately sequentially following the first timeslots, transmissions are allocated to antenna driver signals in a second sequence, the second sequence being the first sequence in reverse.

6. The method in accordance with claim 5, wherein the first sequence is randomized across the antenna driver signals.

7. The method in accordance with claim 6, wherein the first sequence is generated in accordance with a sequence generation algorithm.

8. The method in accordance with claim 7, wherein the sequence generation algorithm is operable to generate a sequence of timeslots, the number of timeslots in the sequence being equal to the number of antenna driver signals to which transmissions are to be allocated.

9. A non-transitory computer program product comprising computer executable instructions which, when executed by a general purpose computer, cause the computer to perform a method of allocating antenna driver signals, each antenna driver signal being for driving an antenna transmission at a radio frequency, RF, comprising allocating timeslots defined in a processing interval to one of the antenna driver signals, such that, in a timeslot, a maximum of one of the antenna drive signals is allocated for transmission, the allocation being according to a non-sequential time division multiple access, TDMA, scheme, wherein the non-sequential TDMA scheme allocates timeslots to antenna driver signals such that, for a first set of timeslots, transmissions are allocated to antenna driver signals in a first sequence while, for a second set of timeslots, immediately sequentially following the first timeslots, transmissions are allocated to antenna driver signals in a second sequence, the second sequence being the first sequence in reverse.

10. The non-transitory computer program product in accordance with claim 9, wherein the first sequence is randomized across the antenna driver signals.

11. The non-transitory computer program product in accordance with claim 10, wherein the first sequence is generated in accordance with a sequence generation algorithm.

12. The non-transitory computer program product in accordance with claim 11, wherein the sequence generation algorithm is operable to generate a sequence of timeslots, the number of timeslots in the sequence being equal to the number of antenna driver signals to which transmissions are to be allocated.

* * * * *